Patented Oct. 23, 1951

2,572,761

UNITED STATES PATENT OFFICE 2,572,761

METHOD AND TECHNIQUE OF FOOD DRYING

Eugene Rivoche, Washington, D. C.

No Drawing. Application July 26, 1949,
Serial No. 106,959

3 Claims. (Cl. 99—199)

This invention relates to a new and improved method of treating food products by drying. More specifically, it relates to a preservation method which has as a part thereof the steps of freezing such products, subsequently comminuting the frozen products so that they are in the form of small, discrete particles, and thereafter drying such particles.

In the drying of food products, there are five basic laws to be remembered. First, the quicker the drying process, the less time is needed to transform a part of the natural product into a dry stage, with the accompanying reduction in danger of the deterioration of the product and its resultant cost.

Secondly, the smaller the division of the food products at the moment they are submitted to the drying action, the larger are the evaporation surfaces and the faster the drying operation. Third, the less cellular distraction of the food product that is provoked by its reduction to extremely small particles, the greater is the increase in the dry powder obtained, and once reconstituted by the re-absorption of the evaporated water will be similar in taste and aspect to the same product prepared from the fresh not previously dried product.

Fourth, the smaller the time period that the product remains divided in small particles before it is submitted to the dryer, the better is the dry product obtained. Fifth, the minimum of overheating the better is the product obtained.

Unfortunately, it has previously been most difficult and impractical to satisfy these basic requirements in the drying of food products. Practically only foodstuffs in fluid form, like milk, fruit juices, eggs or those in a very fine powdered form are suitable to be dried in conditions respecting the above mentioned five principles.

Taking into consideration these five principles, fluid food products are mostly dried by spray drying or processes which have drying actions similar to that of spray drying. This is due to the fact that fluid products, by the use of these methods, are readily reduced to a mass of extremely small particles, allowing in this way to obtain practically an instantaneous drying of each of those small particles, and in this way to reduce to a minimum the time needed to transform the particle of the natural product to a dry one.

The object of this invention is to provide a method of transforming raw or cooked whole food products into a fine powdered form previous to the drying of the product, and in this way to successfully perform the drying process in accordance with the five requirements outlined above. The reduction of the food product to a mass of very fine particles having no tendency to adhere to each other permits the use of quick drying techniques which otherwise would not be available. The term "quick drying" as used in this application is meant to indicate processes in which individual small particles of the product being treated are very quickly and, in some cases, instantaneously dried. Apparatus which may be utilized to carry out such quick drying processes may incorporate, for example, either a spray drier, a hot air spray drier, a centrifugal or cyclone drier, a super-heated steam drier, or a vacuum drier of any suitable type.

The improved new method consists essentially in the freezing of the raw or cooked food product, subsequently reducing this frozen product to a very fine dry frozen powder similar to a snow mist by any suitable means, as for example, by rubbing, abrasive crushing or milling action, or by any combinations of such actions. Such a step may be carried out with a type of hammer mill, for example. The application of the process to cooked starchy products like cooked potatoes, if desired to make a reconstitutable potato, is particularly important. The art in question is sufficiently described in many specifications and in short, is to separate and dry the cells of the cooked potato without causing the rupture of any substantial number of them such as to inhibit the object of making a final dish of mashed potatoes practically indistinguishable from the freshly prepared article.

The present invention has a special value in the dehydration of potatoes and other farinaceous products, but of course care must be taken with such products that the process used to break down the frozen potato into the frozen snow obviously is not such as to rupture the cells but to bring about their separation by impact as in a hammer mill, for example, rather than to use a form of abrasion which might sever the cell walls. A very fine powder is thus obtained in which each particle is very light and which is readily adapted to be sprayed by any suitable means, such as by air spray or centrifugal spraying or by gravitation assistance or otherwise on to a rapidly revolving disk as in certain types of spray drying. The frozen particles are dry enough, while frozen, to remain separated and not to be reduced to a sticky or pasty form.

If it is felt to be desirable to have a homogeneous powder made up of those frozen particles of a particular size, it can be obtained by any conventional method adapted to attain such a result. For example, the frozen powder may be passed through a selective sieve prior to the drying step, or the particles may be so treated after drying and thus obtain a homogeneous product.

The very fine frozen powder obtained is made up of particles which are very responsive to any turbulent action produced by the subsequent drying process. Such action is desirable, since it tends against the formation of larger particles.

The use of quick-drying techniques, for example, air spray, centrifugal, spray or cyclone drying, which could not be used previously for most any whole, raw or cooked products with natural moisture content, are well adapted for use in the present method.

The quick-drier is fed while the powder is frozen and therefore dry. The foodstuffs transformed into a fine frozen powder is a product relatively very easy to manipulate, first because if it is frozen at a very low temperature it does not readily melt, and secondly, because even in a melted condition it still remains in a kind of moist powder form composed of a mass of tough cells, due to the frozen effect, surrounded with free water with very little tendency to adhere one to another. A most important advantage is that this mass of frozen powdered cells has not only to be melted but also to be considerably heated before this mass of cells turn back into a creamy or steamy mash stage. Therefore, in many cases, even a cold mass of melted frozen food powder is suitable to be treated by quick drying methods, like for example, spray drying, centrifugal drying, cyclone drying, etc.

I have also discovered that in most cases, the use of the subject process will give more adequate and efficient results if the cooked food product is directly frozen while at its maximum heat without chilling prior to its freezing. This has the disadvantage of losing the benefit of free evaporation of moisture while the product is being chilled, and also of losing the benefit of being obliged to freeze less water, but has the more important advantage of obtaining a frozen product which is more fracturable, and the process of the separation of the cells of the treated product through freezing is more easily performed.

These advantages are obtained because if the product is quickly frozen while very hot, a large quantity of vapor, instead of being evaporated while chilling, is practically instantaneously condensed through the quick-freezing action. In this way, a multiplicity of small water droplets are formed inside of the product, between the cells which, when transformed into ice crystals, produce a very beneficial cell dislocation action, which facilitates the obtaining of a very fine frozen powder. The most immediate formation of a fine ice crust around the hot product has a tendency to retain inside of the hot product vapor which is then condensed in the above described form.

The freezing of the cooked product while still at a high temperature is especially recommended when the above freezing steps are combined with the intermediate step of partially drying the product prior to the freezing step, with subsequent reduction of the frozen product to a fine frozen powder. In many cases, this method of freezing hot cooked products permits of a higher degree of a partial pre-drying of the product before submitting it to the new process.

The freezing of the cooked product, while it is very hot, is especially recommended when the subject new intermediary steps of freezing the cooked product with the object of reducing it to powder is combined with the partial dehydrating of the product prior to the freezing step. For example, such a partial drying before the freezing step produces a frozen product which is much less affected by the physical action of freezing or is more economical to freeze. In addition, it may be desirable to first remove a part of the water content of the foodstuff and then saturate it with other desirable products before the freezing step, and in this way obtain a considerably enriched and improved frozen product.

It is also obvious that a partial drying of a raw or cooked product before the freezing step will permit a more rapid freezing and will subsequently allow a more rapid and complete drying of the frozen powder. It also may be useful to utilize such a pre-drying step in the treatment of food products with a very large moisture content, since generally such products give off their first moisture very readily and the application of intense heat may be utilized, thus making this first partial elimination of moisture very economical and very rapid, which may aid in avoiding any deterioration of the product.

The degree of the preliminary drying, as described above, of course depends upon the type of product and its individual moisture content and in any case, must not exceed that quantity which would prevent the predehydrated product from being transformed into the fine frozen dry powder, as described in detail above. In each case, the allowable degree of pre-dehydration is easily determined by simple tests. It is clear that the necessary quantity of water should remain in the product so that the size and quantity of those ice crystals shall be sufficient to be able to provide the necessary dislocations and changes in the physical structure of the product which ultimately allows the obtaining from the frozen product the very fine dry frozen powder similar to snow. In actual practice, the pre-dehydration step will probably only be used in exceptional cases, as for the enrichment of the treated product by saturation with desirable solutions previous to the freezing step.

In this case the continuous feeding of this type of dryer would be with frozen blocks of foodstuffs instead of being fed with previously prepared fine frozen powder from those frozen blocks.

In practice, the drying process is performed so that, in the first stage, the introduction of the frozen particles, or cold melted mass of them, are treated by slow agitation at relatively low temperatures, gradually and in proportion to the evaporation of the product, with the speed of agitation and temperature being increased whereby one particle is prevented from adhering to another. It is obvious that the above operation would be one easy to control by one skilled in the art.

The criterion of treatment of the product when using mechanical agitation is that the temperature must not be sufficiently high that the individual particles regain their tendency to adhere one to another and absorbing the surrounding free water.

The individual characteristics of each product will allow easy determination of the maximum heat which may be applied to the treatment of the specific product. As a general rule, the temperature which is to be applied during treatment of the product depends upon the character, moisture contents, and type of food products treated when using mechanical agitation. In the first stage, which is the most delicate one, the temperature should not exceed 75 degrees Fahrenheit. Thereafter it may be gradually and proportionately increased.

This new method opens a whole new field in food products treatment. The efficiency of the described method is obvious for starchy vegetables, such as cooked potatoes, which has been impossible heretofore to transform directly into powdered form except by the laborious pre-drying method. It is also equally applicable to most of the other food products; for example, whole fruits, vegetables, meat and fish, berries, etc.

The obtaining of different whole fruits in powdered form is thereby made a practical and more effective process. Many fruit and vegetable powders prepared today, like, for instance, tomato, orange, or lemon powders, are not powders of the whole fruit but powders of the juice of those fruits which has been extracted and dried by the above described quick-drying processes like spray, centrifugal or vacuum drying. This use of the juice alone is due to the fact that it is difficult to dry the whole mass of a fruit sufficiently completely to enable them to be milled without spoiling. These disadvantages result in an economical loss, as well as a loss of quality and a loss of the inherent characteristics of the obtained products.

By using only the juices, the very valuable parts of the fruit contained in the pulp which are eliminated by the production of the juice are lost in the final product. Such fruit juice powder is useful mainly in the preparation of beverages or like liquids, whereas a whole fruit powder is a product which will permit an easy reconstitution of the whole fruit containing its natural ingredients, and which is useful for the same purposes as those for which the natural fruit may be used. It is obvious, for example, that the whole fruit powder can be used easily as well for the preparation of liquids as for the addition to any other powder as, for example, children's foods and breakfast foods, or a corresponding quantity of powdered sugar, for example. If powdered sugar is added in this way a product is provided which gives a dry sweet powder mixture suitable for preparing liquids or quick reconstitution of sauces or jams, by the addition of the corresponding quantity of evaporated water. Of course, the fruit powder alone could also be used for quick or instantaneous preparation of fruit sauces and jams by the addition of the complementary quantity of water and sugar.

Also, dried meat or fish powder, cooked or uncooked, can now be prepared in a practical and economical way. With the presently known processes, the products obtained are mostly very costly and not of high quality due to the extreme difficulty in obtaining rapidly a sufficiently dried meat or fish product. The drying time of those products is very considerable. The risks of alteration of the product while drying are very great and often necessitate the use of special preservation means to prevent for example, oxidation and fermentation actions. Whereas in the process which is the subject of this application, the fish and meat are treated in the best of conditions with respect to such possible alterations. The raw or cooked product is frozen, a process which is well known as one which does not alter the quality of the product at all. Once frozen, it is reduced instantaneously to a dry powder directly from the frozen stage, which eliminates all risks of any deterioration whatsoever. Another obvious advantage of this subject process is that by its very nature, the flavor, quality, taste and color of the product is preserved and retained in the most efficient way.

For purposes of convenience in handling and manipulating the frozen food products prior to and during the comminuting step, it is normally advisable but not essential to reduce the product to a desirable physical form and conformation, prior to freezing. The product may be given a mash form and placed in molds having a block or cylindrical form of a suitable size, for example, before freezing, or the natural form of the product may be such that it can be compressed so as to have such a form prior to freezing.

Giving the frozen product a block or cylindrical form, for example, will normally increase the ease of handling of the product when frozen, and is particularly advantageous when it is desired to provide a continuous feed to a combination powdering and drying apparatus.

It can thus be seen that with a few minor exceptions, most raw and cooked food products regardless of their natural form can be reduced to a powdered form and then successfully dried by the novel process which is the subject matter of this application.

It also should be understood that the examples given in the preceding discussion are merely for purposes of illustration, as obvious modifications, such as would occur to an individual skilled in the art, may be made in the disclosed process without departing from the spirit or scope of the invention, which should be interpreted and limited only by the claims appended hereto, as viewed in the light of the prior art.

I claim:

1. The method of treating a moisture-containing foodstuff which includes the steps of cooking the foodstuff, subjecting the cooked foodstuff to a freezing operation while it still contains a large amount of the heat resulting from the cooking operation, the freezing being sufficiently rapid that the surface portions of the foodstuff are frozen while the interior portions thereof contain a substantial amount of the heat of the cooking operation, whereby water vapor evaporates from the cells in the interior portions of the foodstuffs after the exterior portions are frozen and condenses between the cells thereof, continuing the freezing until the foodstuff is substantially completely frozen, reducing the completely frozen foodstuff to small, discrete, solid particles, and drying the discrete, solid particles.

2. The method of treating a moisture-containing foodstuff as defined in claim 1, in which the frozen discrete, solid particles are dried while suspended in a gaseous atmosphere.

3. The method of treating a moisture-containing foodstuff as defined in claim 1, in which a portion of the moisture of the foodstuff is removed before it is cooked.

EUGENE RIVOCHE.

REFERENCES CITED

The following references are of record in the file of this patent:

UNITED STATES PATENTS

| Number | Name | Date |
|---|---|---|
| 2,388,917 | Hormel | Nov. 13, 1945 |
| 2,419,877 | Birdseye | Apr. 29, 1947 |
| 2,467,318 | Kellogg | Apr. 12, 1949 |